(12) United States Patent
Anantharajaiah et al.

(10) Patent No.: US 9,971,805 B2
(45) Date of Patent: May 15, 2018

(54) CARDINALITY ESTIMATION OF A JOIN PREDICATE

(71) Applicant: International Business Machines Corporation, Armonk, NY (US)

(72) Inventors: Sahana H. Anantharajaiah, Bangalore (IN); Harjindersingh G. Mistry, Bangalore (IN); Ajay M. Patil, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/667,740

(22) Filed: Aug. 3, 2017

(65) Prior Publication Data

US 2017/0364559 A1 Dec. 21, 2017

Related U.S. Application Data

(63) Continuation of application No. 15/183,178, filed on Jun. 15, 2016.

(51) Int. Cl.
*G06F 17/30* (2006.01)
*G06F 17/18* (2006.01)
*G06F 17/17* (2006.01)

(52) U.S. Cl.
CPC ........ *G06F 17/30466* (2013.01); *G06F 17/18* (2013.01); *G06F 17/30292* (2013.01); *G06F 17/175* (2013.01)

(58) Field of Classification Search
CPC ......... G06F 17/30466; G06F 17/30292; G06F 17/18; G06F 17/30477
See application file for complete search history.

(56) References Cited

U.S. PATENT DOCUMENTS

| 5,918,225 A | * | 6/1999 | White | G06F 17/30324 |
| 5,960,428 A | * | 9/1999 | Lindsay | G06F 17/30466 |
| 6,775,681 B1 | * | 8/2004 | Ballamkonda | G06F 17/30454 707/718 |
| 7,386,538 B2 | | 6/2008 | Muras | |

(Continued)

FOREIGN PATENT DOCUMENTS

WO 2015042070 A1 3/2015

OTHER PUBLICATIONS

Re et al., "Understanding Cardinality Estimation using Entropy Maximization", PODS'10, Jun. 6-11, 2010, Indianapolis, Indiana, Copyright 2010 ACM, pp. 53-64.

(Continued)

*Primary Examiner* — Noosha Arjomandi
(74) *Attorney, Agent, or Firm* — William H. Hartwell (57) ABSTRACT

In one embodiment, a method for improving cardinality estimation of a join predicate between a fact table and an overloaded dimension table is provided. The method includes receiving a dimension table and a fact table in a join predicate of one or more SQL statements. The method further includes identifying a majority of records in the fact table that refer to a subset of records in the dimension table. The method further includes computing a filter factor of the join predicate between the dimension table and the fact table. The method further includes creating a statistical view using one or more relevant portions of the dimension table that are referred to by the fact table.

1 Claim, 4 Drawing Sheets

(56) References Cited

U.S. PATENT DOCUMENTS

| | | | |
|---|---|---|---|
| 7,593,931 | B2 | 9/2009 | Zuzarte et al. |
| 7,945,558 | B2 | 5/2011 | Krishna |
| 8,185,519 | B2 | 5/2012 | Chaudhuri et al. |
| 8,386,450 | B2 | 2/2013 | Simmen |
| 9,141,667 | B2 | 9/2015 | Barber et al. |
| 9,720,966 | B2* | 8/2017 | Ghazal ............... G06F 17/30463 |
| 9,727,608 | B2* | 8/2017 | Cheng ............... G06F 17/30463 |
| 9,734,205 | B2* | 8/2017 | Rash ................ G06F 17/30483 |
| 2003/0182276 | A1* | 9/2003 | Bossman ........... G06F 17/30306 |
| 2005/0187917 | A1* | 8/2005 | Lawande .......... G06F 17/30306 |
| 2007/0226178 | A1* | 9/2007 | Ewen .......... G06F 17/30442 |
| 2008/0086444 | A1 | 4/2008 | Yu et al. |
| 2008/0133458 | A1* | 6/2008 | Zabback ........... G06F 17/30469 |
| 2010/0198806 | A1* | 8/2010 | Graefe ............. G06F 17/30463 |
| | | | 707/713 |
| 2010/0198810 | A1* | 8/2010 | Graefe ............. G06F 17/30463 |
| | | | 707/718 |
| 2011/0302151 | A1* | 12/2011 | Abadi ............... G06F 17/30445 |
| | | | 707/714 |
| 2012/0047158 | A1* | 2/2012 | Lee ................... G06F 17/30469 |
| | | | 707/759 |
| 2014/0279838 | A1* | 9/2014 | Tsirogiannis ..... G06F 17/30292 |
| | | | 707/603 |
| 2015/0199407 | A1 | 7/2015 | Ziauddin et al. |
| 2015/0220617 | A1* | 8/2015 | Luo .................. G06F 17/30598 |
| | | | 707/737 |
| 2015/0363433 | A1* | 12/2015 | Marinoiu .......... G06F 17/30292 |
| | | | 707/803 |
| 2016/0055205 | A1* | 2/2016 | Jonathan ........... G06F 17/30454 |
| | | | 707/714 |
| 2016/0350347 | A1 | 12/2016 | Das et al. |
| 2016/0350375 | A1* | 12/2016 | Das ................... G06F 17/30463 |
| 2017/0031967 | A1* | 2/2017 | Chavan ............. G06F 17/30345 |
| 2017/0060772 | A1* | 3/2017 | Krishnappa ............ G06F 12/12 |
| 2017/0091229 | A1* | 3/2017 | Jagota .............. G06F 17/30292 |
| 2017/0147646 | A1* | 5/2017 | Lee .................. G06F 17/30466 |
| 2017/0270160 | A1* | 9/2017 | Brodt ............... G06F 17/30463 |

OTHER PUBLICATIONS

Anantharajaiah, et al., "Cardinality Estimation of a Join Predicate", U.S. Appl. No. 15/183,178, filed Jun. 15, 2016, 42 pages.

IBM, Appendix P, List of IBM Patents or Patent Applications Treated as Related, dated Aug. 3, 2017, 2 pages.

* cited by examiner

FIG. 1

```
select   202         204         206            208          210          212
...
from store_sales, store_returns, catalog_sales, date_dim d1, date_dim d2, date_dim d3
...
where d1.d_quarter_name = '2001Q1'
   and d1.d_date_sk = ss_sold_date_sk        } 214
...
   and sr_returned_date_sk = d2.d_date_sk
   and d2.d_quarter_name in ('2001Q1','2001Q2','2001Q3')   } 216
...
   and cs_sold_date_sk = d3.d_date_sk
   and d3.d_quarter_name in ('2001Q1','2001Q2','2001Q3')   } 218
...
```

CARDINALITY ESTIMATION OF A JOIN PREDICATE

BACKGROUND

The present invention relates generally to the field of query optimization, and more particularly to cardinality estimation of join between a fact table and an overloaded dimension table.

In relational database queries, cardinality estimation is the problem of estimating the number of tuples returned by a query. Cardinality estimation is a fundamentally important task in data management, used in query optimization, progress estimation, and resource provisioning.

In computing, a star schema, also referred to as snowflake schema, is a style of data mart schema and is a commonly used schema for a data warehousing environment. The star schema consists of one or more fact tables referencing any number of dimension tables. The star schema is an important special case of the snowflake schema, and is more effective for handling simpler queries.

In data warehousing, a fact table includes measurements, metrics, or facts of a business process. The fact table is located at the center of a star schema or a snowflake schema surrounded by dimension tables. Where multiple fact tables are used, these are arranged as a fact constellation schema. A fact table typically has two types of columns: those that contain facts and those that are a foreign key to dimension tables. The primary key of a fact table is usually a composite key that is made up of all of its foreign keys. Fact tables contain the content of the data warehouse and store different types of measures that fall into three categories: additive, non-additive, and semi additive measures. Additive measures are the most flexible and useful facts that can be summed across any of the dimensions associated with a fact table. An example of fully additive measures are sales, or purchases, from a store where hourly sales can be added to determine the sales for a day, a week, a month, a quarter, or a year. Semi-additive measures can be summed across some dimensions, but not all. For example, checking account balance or savings account balance are two common semi-additive facts. A savings account balance can be determined using a transactions file. However, balancing amounts from October, November, and December across the time dimension may not be practical. An example of non-additive measures are ratios. An approach for non-additive facts is, where possible, to store the fully additive components of the non-additive measure and sum fully additive components into the final answer set, then calculate the final non-additive fact.

In data warehousing, a dimension table is one of the set of companion tables to a fact table. Dimension tables usually have a relatively small number of records compared to fact tables, but each record may have a very large number of attributes to describe the fact data. Contrary to fact tables, dimension tables contain descriptive attributes (or fields) that are typically textual fields (or discrete numbers that behave like text).

SUMMARY

Embodiments of the present invention disclose a method, computer program product, and system for improving cardinality estimation of a join predicate between a fact table and an overloaded dimension table is provided. The method includes receiving a dimension table and a fact table in a join predicate of one or more SQL statements. The method further includes identifying a majority of records in the fact table that refer to a subset of records in the dimension table. The method further includes computing a filter factor of the join predicate between the dimension table and the fact table. The method further includes creating a statistical view using one or more relevant portions of the dimension table that are referred to by the fact table.

DETAILED DESCRIPTION

Embodiments in accordance with the present invention recognize that cardinality estimation is one of the most critical tasks performed during query (for example, Structured Query Language (SQL) query) optimization. The quality of an SQL access plan, also referred to as a query plan (or a query execution plan), depends heavily on the accuracy of cardinality estimation. An SQL access plan is an ordered set of steps used to access data in a SQL relational database management system. In a typical star schema setup, a dimension table might contain "extra" data that is not relevant for the present state of business. However, the extra data may become relevant at a later time. For example, a DATE dimension table might contain data about future dates and/or past dates and majority of fact table records refer to a very small fraction, or a small subset, of dimension table records. Stated another way, a majority of records in the fact table can refer to a small subset of records in one or more dimension tables. For example, 90% of the records in a fact table may refer to less than 50% of the records in a first dimension table, and less than 25% of the records in a second dimension table. In another example, a fact table is for a company that sells products to customers, where every sale is recorded in the fact table. The fact table can include columns to record the time of the sale, a product ID, a customer ID, and the number of units sold. A dimension table can then be used to record additional data about the customer. The dimension table can include columns for a customer ID, a customer name, a gender, the customer's income, the customer's education level, and the customer's address. In this example, the customer ID is ¼ of the fact table records, whereas the customer ID in the dimension table is $\frac{1}{6}^{th}$ the dimension table records. This dimension table is referred to as having "overloaded" dimensions. Embodiments of the present invention propose a method to estimate cardinality of join between a fact table and an overloaded dimension table.

Some embodiments of the present invention may include one, or more, of the following features, characteristics, and/or advantages: (i) when incorporated into existing methods, they provide a solution that works out-of-the-box by collecting statistics just-in-time and on-the-fly; (ii) they require no user intervention and are fully automatic, which makes them highly consumable; (iii) they are extremely fast and light-weight due to only a relevant, or small, portion of a dimension table that is scanned; (iv) they are easy to implement into existing data warehousing software resulting in a maximum re-use of current technology (e.g., statistical views, real time statistics, etc.); and/or (v) they are very simple yet very effective for cardinality estimation.

Embodiments of the present invention improve cardinality estimation of a join predicate between a fact table and an overloaded dimension table for the following type of scenarios in one or more SQL statements: (i) an equality join predicate exists between a fact table and a dimension table, (ii) an overloaded dimension table exists, (iii) a local predicate exists on the dimension table, and/or (iv) all the predicates on dimension table are in conjunction (e.g. "ANDed"). These scenarios can be very common, especially with DATE and TIMESTAMP dimensions. Embodiments will describe the present invention by using a scenario from TPCDS benchmark query 17, which involves a join between fact table STORE_RETURNS and dimension table DATE_DIM. However, the present invention is equally applicable to other similar overloaded dimension scenarios. The relevant portion of query 17 can be seen in the following (Code Snippet 1):

---
Code Snippet 1—Query 17
---
```
SELECT
 ...
FROM
    STORE_RETURNS, DATE_DIM D2, ...
WHERE
    SR_RETURNED_DATE_SK = D2.D_DATE_SK AND D2.
D_QUARTER_NAME IN ( '2001Q1', '2001Q2', '2001Q3' )
 ...
```
---

Figure 1:
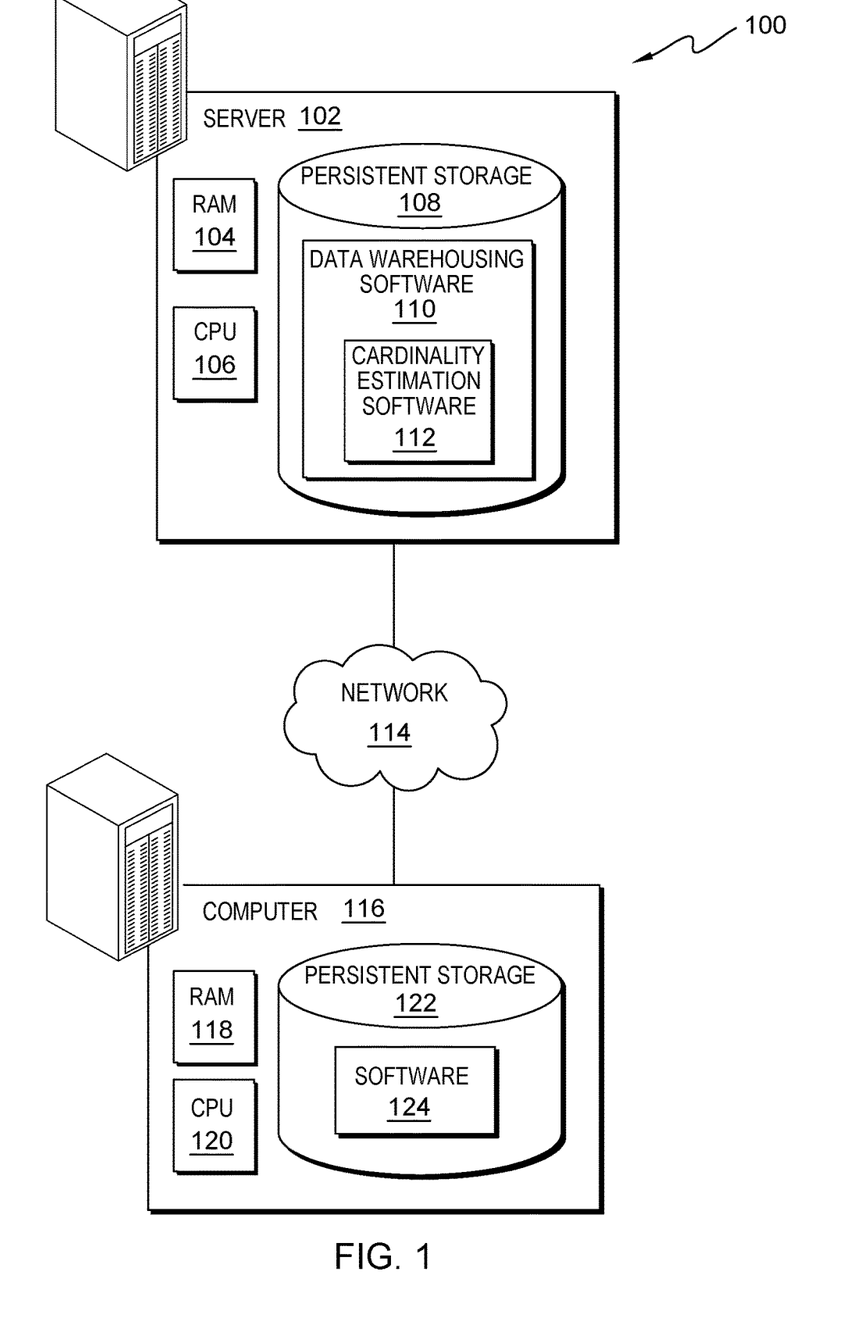
FIG. 1 is a functional block diagram illustrating a data warehousing environment, in an embodiment in accordance with the present invention.

Embodiments in accordance with the present invention will now be described in detail with reference to the Figures. FIG. 1 is a functional block diagram, generally designated 100, illustrating a data warehousing environment, in an embodiment in accordance with the present invention.

Data warehousing environment 100 includes server 102, computer 116, and other computing devices (not shown), all interconnected over network 114. Server 102 includes random access memory (RAM) 104, central processing unit (CPU) 106, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, server 102 may represent server computing systems utilizing multiple computers as a server system, such as in a distributed computing environment. In general, server 102 is representative of any electronic devices or combinations of electronic devices capable of executing machine-readable program instructions and communicating with computer 116 via network 114 and with various components and devices (not shown) within data warehousing environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Data warehousing software 110, which contains cardinality estimation software 112, is stored in persistent storage 108, which also includes operating system software (not shown), as well as software that enables server 102 to perform cardinality estimations during query optimizations, and communicate with computer 116 and other computing devices (not shown) of data warehousing environment 100 over a data connection on network 114. In other example embodiments, data warehousing software 110 and cardinality estimation software 112 may be components of an operating system software.

Data warehousing software 110 and cardinality estimation software 112 are computer programs, or sets of computer programs, that are stored in persistent storage 108. Data warehousing software 110 enables a user to store current and historical data and create analytical reports. For example, data warehousing software 110 may be used to generate reports that range from annual and quarterly comparisons and trends, to detailed daily sales analyses.

Cardinality estimation software 112 is included in data warehousing software 110. Cardinality estimation software 112 is a computer program, or sets of computer programs, used by data warehousing software 110 to optimize queries by using the statistics of only the relevant portion of an 'overloaded' dimension table. Stated another way, cardinality estimation software 112 may statistically discard the overloaded portion of a dimension table.

Figure 4:
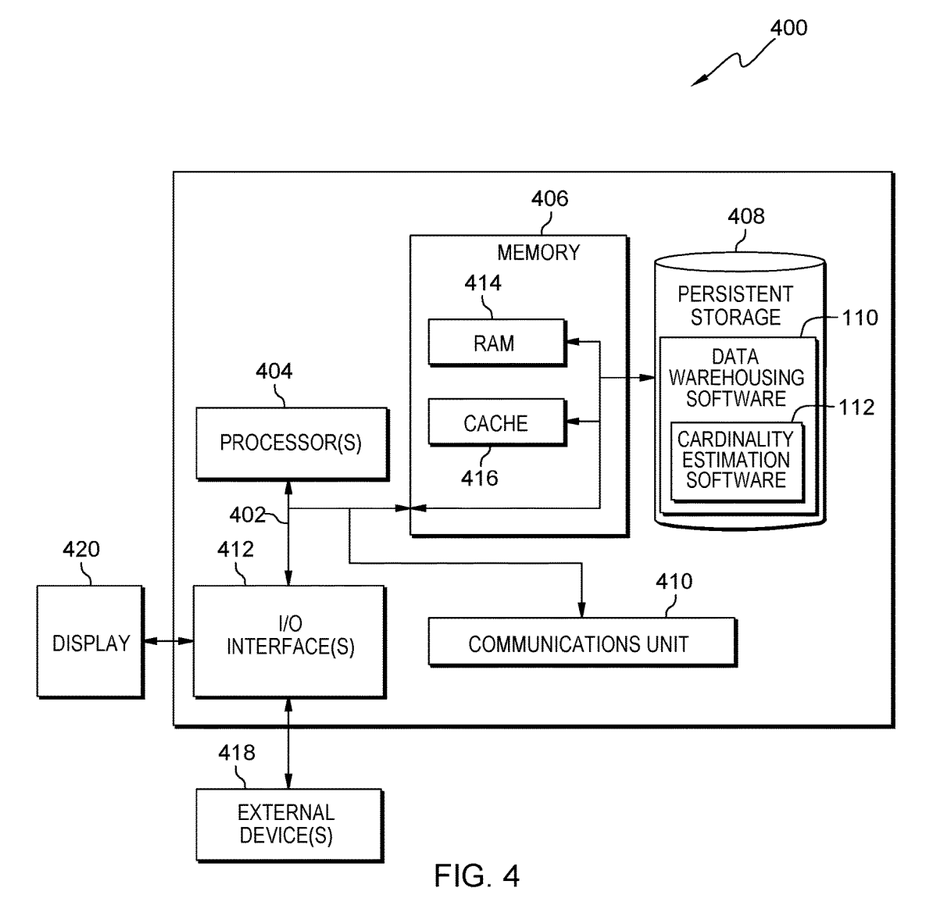
FIG. 4 depicts a block diagram of components of the server executing the cardinality estimation software, in an embodiment in accordance with the present invention.

Server 102 may include internal and external hardware components, as depicted and described in further detail with respect to FIG. 4.

In FIG. 1, network 114 is shown as the interconnecting fabric between server 102, computer 116, and with various components and devices (not shown) within data warehousing environment 100. In practice, the connection may be any viable data transport network, such as, for example, a LAN or WAN. Network 114 can be for example, a local area network (LAN), a wide area network (WAN) such as the Internet, or a combination of the two, and include wired, wireless, or fiber optic connections. In general, network 114 can be any combination of connections and protocols that will support communications between server 102, computer 116, and with various components and devices (not shown) within data warehousing environment 100.

Computer 116 is included in data warehousing environment 100. Computer 116 includes user random access memory (RAM) 118, central processing unit (CPU) 120, and persistent storage 122. Computer 116 may be a Web server, or any other electronic device or computing system, capable of processing program instructions and receiving and sending data. In some embodiments, computer 116 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, computer 116 may represent server computing systems utilizing multiple computers as a server system, such as in a distributed computing environment. In general, computer 116 is representative of any electronic devices or combinations of electronic devices capable of executing machine-readable program instructions and communicating with server 102 via network 114 and with various components and devices (not shown) within data warehousing environment 100.

Computer 116 includes persistent storage 122. Persistent storage 122 may, for example, be a hard disk drive. Alternatively, or in addition to a magnetic hard disk drive, persistent storage 122 may include a solid state hard drive, a semiconductor storage device, read-only memory (ROM), erasable programmable read-only memory (EPROM), flash memory, or any other computer-readable storage medium that is capable of storing program instructions or digital information. Software 124 is stored in persistent storage 122, which also includes operating system software, as well as software that enables computer 116 to detect and establish a connection to server 102, and communicate with other computing devices (not shown) of data warehousing environment 100 over a data connection on network 114.

Figure 2:
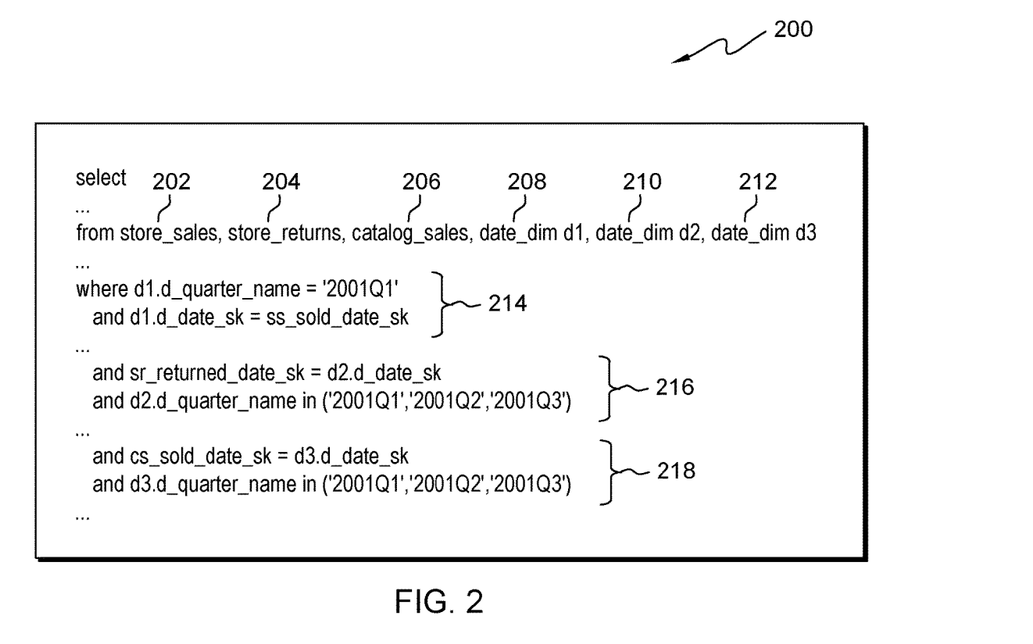
FIG. 2 is an example SQL statement comprising an equality join predicate between one or more fact tables and an overloaded dimension table, on a server within the data warehousing environment of FIG. 1, where all the predicates on the overloaded dimension table are in conjunction with each other, in an embodiment in accordance with the present invention.
Figure 3:
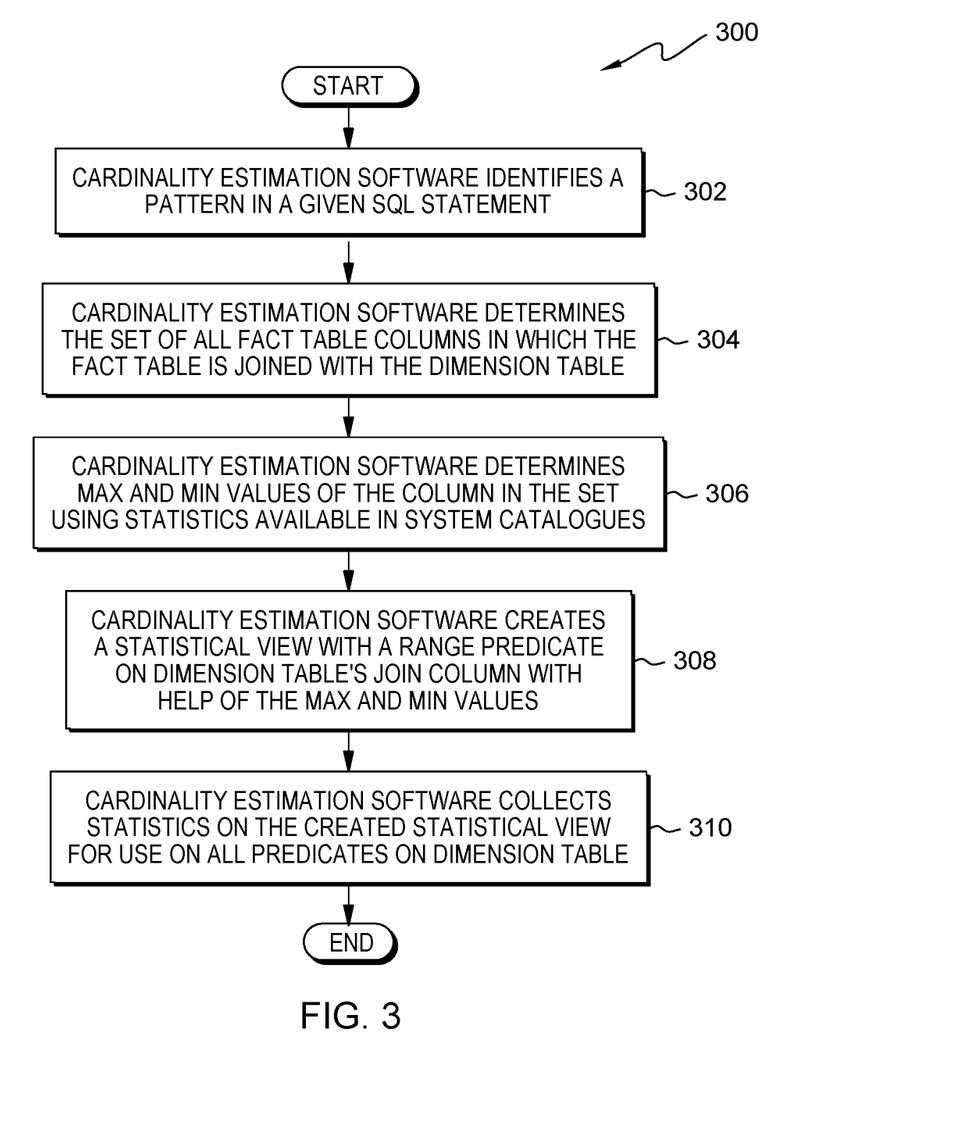
FIG. 3 is a flowchart depicting operational steps of a cardinality estimation software, on a server within the data warehousing environment of FIG. 1, for improving cardinality estimation of a join predicate, in an embodiment in accordance with the present invention.

FIG. 2 is an example SQL statement comprising an equality join predicate between one or more fact tables and an overloaded dimension table, on a server within the data warehousing environment of FIG. 1, where all the predicates on the overloaded dimension table are in conjunction with each other, in an embodiment in accordance with the present invention. FIG. 3 is a flowchart, generally designated 300, depicting operational steps of a cardinality estimation software, on a server within the data warehousing environment of FIG. 1, for improving cardinality estimation of a join predicate, in an embodiment in accordance with the present invention. The example SQL statement of FIG. 2 and the operational steps of FIG. 3 will now be discussed over the course of the following paragraphs.

In an example embodiment, data warehousing software 110 receives SQL statement 200 (see FIG. 2), from computer 116 via a data connection to network 114. Cardinality estimation software 112 identifies a pattern in SQL statement 200 as depicted in step 302 (see FIG. 3). For example, cardinality estimation software 112 identifies a pattern in an equality join predicate between fact tables "store_sales" 202, "store_returns" 204, "catalog_sales" 206, and dimension table "date_dim d1" 208 (see FIG. 2). Cardinality estimation software 112 also identifies dimension table "date_dim d1" 208 as an overloaded dimension. For example, dimension table "date_dim d1" 208 may contain a DATE dimension that contains data pertaining to one or more future dates that are not referred to by a majority of the fact tables (e.g., fact tables "store_sales" 202, "store_returns" 204, "catalog_sales" 206). In other example embodiments, cardinality estimation software 112 identifies a pattern in an equality join predicate between fact tables "store_sales" 202, "store_returns" 204, "catalog_sales" 206, and dimension tables "date_dim d2" 210, and "date_dim d3" 212". Cardinality estimation software 112 also identifies dimension table "date_dim d1" 208 as having one or more local predicates. For example, cardinality estimation software 112 determines that there is a local predicate on dimension table "date_dim d3" 212. For example, dimension table "date_dim d1" 208 has d1.d_quarter_name='2001Q1', d2 has d2.d_quarter_name in ('2001Q1', '2001Q2', '2001Q3') and d3 has d3.d_quarter_name in ('2001Q1', '2001Q2', '2001Q3'). Additionally, cardinality estimation software 112 determines that all the predicates on dimension table "date_dim d1" 208 are in conjunction with each other. For example, cardinality estimation software 112 determines that all the predicates on dimension table "date_dim d1" 208 are ANDded. Predicates being ANDded means there is no OR predicate. The main target is an AND scenario, which is common in star schema queries.

In step 304 (see FIG. 3), Cardinality estimation software 112 determines the set of all fact table columns in which the fact table is joined with the dimension table. For example, cardinality estimation software 112 will determine a set of all fact table columns where dimension table "date_dim d1" 208 is joined on column "d_date_sk". This set of all fact table columns can been denoted by S={"ss_sold_date_sk", "sr_returned_date_sk", "cs_sold_date_sk"} and depicted by reference indicators 214, 216, and 218 (see FIG. 2).

Cardinality estimation software 112 determines MAX and MIN values of the column in the set using statistics available in system catalogues as depicted in step 306 (see FIG. 3). From the statistics available in system catalogs (not shown), cardinality estimation software 112 may determine the MAX and MIN value of the columns in set S. Continuing with the previous example, the statistics (i.e., MAX and MIN values for columns "ss_sold_date_sk", "sr_returned_date_sk", "cs_sold_date_sk") values can be seen in the following (Code Snippet 2):

| Code Snippet—2 MAX/MIN values |
| --- |
| MAX( cs_sold_date_sk ) = 2452653 and MIN( cs_sold_date_sk ) = 2450816 |
| MAX( sr_returned_date_sk ) = 2452822 and MIN( sr_returned_date_sk ) = 2450821 |
| MAX( ss_sold_date_sk ) = 2452642 and MIN( ss_sold_date_sk ) = 2450817 |
| MAX_VALUE = maximum of all MAX values = 2452822 and MIN_VALUE = minimum of all MIN values = 2450816 |

Pertaining to column "cs_sold_date_sk", cardinality estimation software 112 determines the maximum value is 2452653 and the minimum value is 2450816. Pertaining to column "sr_returned_date_sk", cardinality estimation software 112 determines the maximum value is 2452822 and the minimum value is 2450821. Pertaining to column "ss_sold_date_sk", cardinality estimation software 112 determines the maximum value is 2452642 and the minimum value is 2450817. Cardinality estimation software 112 then determines the maximum value for all MAX values (i.e., the maximum value for columns "ss_sold_date_sk", "sr_returned_date_sk", and "cs_sold_date_sk"), is 2452822 and the minimum value for all MIN values (i.e., the minimum value for columns "ss_sold_date_sk", "sr_returned_date_sk", and "cs_sold_date_sk"), is 2450816.

In step 308 (See FIG. 3), cardinality estimation software 112 creates a statistical view, to be later used by cardinality estimation software 112 for cardinality estimations, with a range predicate on the dimension table's join column with help of the MAX and MIN values as seen in the following (Code Snippet 3):

| Code Snippet 3—Statistical View |
| --- |
| CREATE VIEW STATVIEW_DIM AS ( SELECT * FROM date_dim WHERE d_date_sk <= MAX_VALUE AND d_date_sk >= MIN_VALUE ); |

Cardinality estimation software 112 creates the statistical view using the determined maximum and minimum values of all fact table columns where dimension table "date_dim d1" 208 is joined on column "d_date_sk". The statistical view is created from dimension table "date_dim d1" 208 where values for "d_date_sk" are between min value 2450816 and max value 2452822.

Cardinality estimation software 112 collects statistics on the created statistical view for use on all predicates on dimension table as depicted in step 310. Further continuing the previous example, let us consider the cardinality estimation of join between "store_returns" 204 and "date_dim" d1 208. Cardinality estimation software 112 determines the relevant statistics of "store_returns.sr_returned_date_sk" column as seen in the following (Code Snippet 4):

---
Code Snippet 4—Relevant Statistics store_returns.sr_returned_date_sk

CARD1 = 2875430 and COLCARD1 = 1985

---

Cardinality estimation software 112 also determines the relevant statistics of "date_dim.d_date_sk" column as seen in the following (Code Snippet 5):

---
Code Snippet 5—Relevant Statistics date_dim.d_date_sk

CARD2 = 2007 and COLCARD2 = 1985

---

Where CARD=total number of records and COLCARD=total number of unique values in the column collected from the proposed statistical view.

Cardinality estimation software 112 then computes a filter factor join predicate and a filter factor local predicate using statistics from the proposed statistical view as seen in the following (Code Snippet 6):

---
Code Snippet 6—Filter factor of join and local predicate

Filter factor of join predicate = 1 / MAX ( COLCARD1, COLCARD2 ) ( A )
Filter factor of local predicate on "date_dim" d1 ( B )

---

Where the filter factor of the join predicate is the quotient of 1/(the maximum value between COLCARD1 and COLCARD2). For example, using the example values from above, the filter factor of the join predicate is equal to 1/1985. The filter factor of the join predicate on "date_dim" d1 208 is equal to 0.136024.

The total estimated cardinality after the join between "store_returns" 204 and "date_dim" d1 208 is A*B*2875430*2007=395462. This estimated cardinality is much closer to actual number of records (404102) that qualify the predicates sr_returned_date_sk=d2.d_date_sk AND d2. d_quarter_name IN ('2001Q1', '2001Q2', '2001Q3').

In an example embodiment, cardinality estimation software 112 may determine if a previously created statistical view that can be re-used may already exist. For example, cardinality estimation software 112 may determine if a previously created statistical view can be re-used as seen in the following (Code Snippet 6):

---
Code Snippet 6—Statistical View Re-Use

MAX( SV.COL1 ) >= MAX_VALUE AND MIN( SV.COL1 ) <= MIN_VALUE

---

Cardinality estimation software 112 may consider how frequently the statistics are collected/updated for all the database objects. For example, if the statistics are collected and/or updated every week, cardinality estimation software 112 may add a buffer for 7 days into MAX_VALUE and MIN_VALUE as seen in the following (Code Snippet 7):

---
Code Snippet 7—Statistical View Re-Use

CREATE VIEW STATVIEW_DIM AS (
SELECT *
FROM D
WHERE D.COL1 <= (MAX_VALUE + BUFFER) AND
D.COL1 >= (MIN_VALUE − BUFFER));

---

In another example embodiment, cardinality estimation software 112 may determine if the given join is between a fact table and an 'overloaded' dimension table and the join is a simple equality join. For example, cardinality estimation software 112 receives a join predicate as "T1.COL1<OP>T2.COL1" and an output is a flag (e.g., TRUE/FALSE) that indicates if the given join is between a fact table and a dimension table and the join is a simple equality join. If the flag is TRUE, then cardinality estimation software 112 also returns the identified fact and dimension table names as seen in the following (Code Snippet 8):

---
Code Snippet 8—Simple Join Equality Join

```
/* Check the operation involved in join predicate. It has to be equality. */
if ( OP != '=' ) then return False.
/* Consider size of tables to determine fact and dimension tables */
if ( T1.CARD > X_FACTOR * T2.CARD ) then
{
FACT = T1 and DIM = T2
}
else if ( T2.CARD > X_FACTOR * T1.CARD ) then
{
FACT = T2 and DIM = T1
}
else
{
return False
}
/*
* Determine overloaded dimension by using column statistics
* Note:
* COLCARD = Total number of unique values in the column
* HIGH2KEY / LOW2KEY = Second highest / lowest value in the
  column
*/
if ( FACT.COL1.COLCARD < DIM.COL1.COLCARD AND
    FACT.COL1.HIGH2KEY < FACT.COL1.HIGH2KEY AND
    FACT.COL1.LOW2KEY > DIM.COL1.LOW2KEY AND
    ( FACT.COL1.HIGH2KEY − FACT.COL1.LOW2KEY ) /
( DIM.COL1.HIGH2KEY − DIM.COL1.LOW2KEY ) < 0.5 ) then
{
OUTPUT.FACT = FACT
OUTPUT.DIM = DIM
return True
}
else
{
return False
}
```

---

Upon collecting statistics on the created statistical view, cardinality estimation software 112 will indicate whether the given join is between a fact table and a dimension table and the join is a simple equality join, based on the output flag. If the output flag is TRUE, then cardinality estimation software 112 returns the identified fact and dimension table names.

Embodiments of the present invention offer an improvement over cardinality heuristics by taking advantage of an improvement in the filter factor (FF) computation of a local predicate that can be implemented in an optimizer. For example, cardinality estimation is improved when the local predicate FF is improved in scenarios where the local predicate on a dimension table selects rows from the overloaded portion of the dimension table. In the following two examples of cardinality heuristic cases (Code Snippet 9—CASE 1 and Code Snippet 12—CASE 2) where the local predicate is selecting dimension table rows that have many matching fact table rows; if the given literal value is lower than the lowest value in column statistics, then the FF is 0 as seen in the following (Code Snippet 9):

---
Code Snippet 9—CASE 1: Cardinality Heuristic: Regular Mode
---
/* ( DB2_REDUCED_OPTIMIZATION = STARJN_CARD ) */
Predicates:
sr_returned_date_sk = d2.d_date_sk
d2.d_quarter_name in ('2001Q1','2001Q2','2001Q3')
---

In this embodiment, the join cardinality is computed as follows: (i) the heuristic assumes that each distinct value in the fact table join column occurs uniformly; and (ii) the heuristic uses the ratio of row-count/distinct-values-count to find out how many fact table rows will match with the given dim table rows. For example, the join cardinality is computed as follows: join-cardinality=dim-table-rows*row-count/distinct-values-count, where dim-table-rows has a value of 181.203, row-count has a value of 2875432, and distinct-values-count has a value of 1985. Applying these values to determine the join cardinality results in: 181.203*2875432/1985=262487.105640302, which is close enough to actual cardinality 404102, where dim-table-rows is equal to the dimension table rows after applying the local predicate, row-count is equal to the fact table row count, and distinct-values-count is equal to the number of distinct values in the fact table join column.

A second example, where the cardinality heuristic mode is more aggressive, can be as seen in the following (Code Snippet 10):

---
Code Snippet 10—CASE 1: Cardinality Heuristic: Aggressive Mode
---
/* ( DB2_REDUCED_OPTIMIZATION = STARJN_CARD SKEW ) */
Predicates:
sr_returned_date_sk = d2.d_date_sk
d2.d_quarter_name in ('2001Q1','2001Q2','2001Q3')
---

The join cardinality is computed as follows: (i) the heuristic assumes that each distinct value (that is not in freq-stats-values) in the fact table join column occurs uniformly; (ii) the heuristic uses the ratio of row-count/distinct-values-count (after adjusting for freq-stats) to find out how many fact table rows will match with the given dim table rows; (iii) the heuristic assumes that the fact table rows with non-null frequency-stats-value will qualify the join predicate; and (iv) the corresponding freq-stats are also added in the join cardinality. For example, the join cardinality is computed as follows: join-cardinality-part1=sum of all freq-stats of fact table join column. For example, join-cardinality2=(dim-table-rows−freq-stats-counts)*(remaining-row-count/remaining-distinct-values-count), where dim-table-rows has a value of 181.203-9, freq-stats-counts has a value of 2875432, remaining-row-count has a value of 59666, and remaining-distinct-values-count has a value of 1985-9. Applying these values to determine the join cardinality results in: (181.203-9)*(2875432-59666)/(1985-9)= 172.203*2815766/1976=245386.311992915. The final join-cardinality=join-cardinality1+join-cardinality2=59666+ 245386.311992915=305052.311992915, which is close to actual cardinality 404102, where dim-table-rows is equal to the dimension table rows after applying local predicate, freq-stats-counts is equal to the number of non-null freq stats available for fact table join column, remaining-row-count is equal to the fact table row count minus sum of all non-null freq-stats for the fact table join column, and the remaining-distinct-values-count is equal to the number of distinct values in fact table join column that are not in freq stats values.

When applied to the previous two examples of CASE 1, embodiments of the present invention, using an improved computation for the local predicate FF, results in a cardinality estimation as seen in the following (Code Snippet 11):

---
Code Snippet 11—CASE 1: Cardinality Estimation using present invention
---
/* with enhancement in computing local predicate FF */
Predicates:
sr_returned_date_sk = d2.d_date_sk
d2.d_quarter_name in ('2001Q1','2001Q2','2001Q3')
---

The join cardinality is computed as follows: (A) join predicate FF=1/MAX(colcard1, colcard2), where the maximum value between colcard1 and colcard2 has a value of 1985. Applying this value to determine the join predicate FF results in: 1/1985=0.000503778, and (B) local predicate FF=0.136024. Applying these values to determine the total cardinality after the join between STORE_RETURNS and DATE_DIM results in: A*B*2875432*2007=0.000503778* 0.136024*2875432*2007=395462.414673544, which is closer to the actual cardinality of 404102.

A second example case of cardinality heuristic, where the local predicate is selecting dim table rows from the "overloaded" portion of a dimension table, results in a join cardinality as seen in the following (Code Snippet 12):

---
Code Snippet 12—CASE 2: Cardinality Estimation using present invention
---
/* ( DB2_REDUCED_OPTIMIZATION = STARJN_CARD ) */
Predicates:
sr_returned_date_sk = d2.d_date_sk
d2.d_quarter_name in ('1991Q1','1991Q2','1991Q3')
---

The join cardinality is computed as follows: (i) the heuristic assumes that each distinct value in fact table join column occurs uniformly; and (ii) the heuristic uses the ratio of row-count/distinct-values-count to find out how many fact table rows will match with the given dimension table rows. For example, the join cardinality is computed as follows: join-cardinality=dim-table-rows*row-count/distinct-values-count, where dim-table-rows has a value of 238.861893, row-count has a value of 2875432, and distinct-values-count has a value of 1985. Applying these values to determine the join cardinality results in:

238.861893*2875432/1985=346010.645195353, which is very off from the actual join cardinality of 0.

A second example, where the cardinality heuristic mode is more aggressive, can be as seen in the following (Code Snippet 13):

---
Code Snippet 13—CASE 2: Cardinality Heuristic: Aggressive Mode

/* ( DB2_REDUCED_OPTIMIZATION = STARJN_CARD SKEW ) */
Predicates:
sr_returned_date_sk = d2.d_date_sk
d2.d_quarter_name in ('1991Q1','1991Q2','1991Q3')

---

The join cardinality is computed as follows: (i) the heuristic assumes that each distinct value (that is not in freq-stats-values) in fact table join column occurs uniformly; (ii) the heuristic uses the ratio of row-count/distinct-values-count (after adjusting for freq-stats) to find out how many fact table rows will match with the given dim table rows; (iii) the heuristic assumes that the fact table rows with non-null frequency-stats-value will qualify the join predicate; and (iv) the corresponding freq-stats are also added in the join cardinality. For example, the join cardinality is computed as follows: join-cardinality-part1=sum of all freq-stats of fact table join column. For example, join-cardinality2=(dim-table-rows−freq-stats-counts)*(remaining-row-count/remaining-distinct-values-count), where dim-table-rows has a value of 238.861893−9, freq-stats-counts has a value of 2875432, remaining-row-count has a value of 59666, and remaining-distinct-values-count has a value of 1985−9. Applying these values to determine the join cardinality results in: (238.861893−9)*(2875432−59666)/(1985−9)=327549.242411456. The final join-cardinality=join-cardinality1+join-cardinality2=59666+327549.242411456= 387215.242411456, which is very different from the actual join cardinality of 0, where the dim-table-rows is equal to the dimension table rows after applying local predicate, freq-stats-counts is equal to the number of non-null freq stats available for fact table join column, remaining-row-count is equal to the fact table row count minus sum of all non-null freq-stats for the fact table join column, and remaining-distinct-values-count is equal to the number of distinct values in fact table join column that are not in freq stats values.

When applied to the previous two examples of CASE 2, embodiments of the present invention, using an improved computation for the local predicate FF, result in a cardinality estimation as seen in the following (Code Snippet 14):

---
Code Snippet 14—CASE 2: Cardinality Estimation using present invention

/* with enhancement in computing local predicate FF */
Predicates:
sr_returned_date_sk = d2.d_date_sk
d2.d_quarter_name in ('1991Q1','1991Q2','1991Q3')

---

The join cardinality is computed as follows: (A) join predicate FF=1/MAX(colcard1, colcard2), where the maximum value between colcard1 and colcard2 has a value of 1985. Applying this value to determine the join predicate FF results in: 1/1985=0.000503778, and (B) local predicate FF=0 because the literal value is lower than the lowest value in column statistics. Applying these values to determine the total cardinality after the join between STORE_RETURNS and DATE_DIM results in: A*B*2875432*2007= 0.000503778*0*2875432*2007=0, which is the actual cardinality.

FIG. 4 depicts a block diagram, generally designated 400, of components of the server executing the cardinality estimation software 112, in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Server 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Cardinality estimation software 112 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 114 and computer 116. In these examples, communications unit 410 includes one or more network interface cards. Communications unit 410 may provide communications through the use of either or both physical and wireless communications links. Cardinality estimation software 112 may be downloaded to persistent storage 408 through communications unit 410.

I/O interface(s) 412 allows for input and output of data with other devices that may be connected to server 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., cardinality estimation software 112, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

DEFINITIONS

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of "items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" acting as a single "user."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:
    receiving, by one or more processors, a dimension table and a fact table in a join predicate of one or more SQL statements, wherein the received join predicate of the dimension table and the fact table is in a star or snowflake schema, and wherein the one or more SQL statements include:
        an SQL statement comprising an equality join predicate between a fact table and an overloaded dimension table,
        an SQL statement comprising a local predicate on the dimension table, and
        an SQL statement where all the predicates on the dimension table are in conjunction;
    identifying, by one or more computer processors, a majority of records in the fact table that refer to a subset of records in the dimension table, wherein a majority of records in the dimension table contain data that is not relevant for the join predicate;
    computing, by one or more computer processors, a filter factor of the join predicate between the dimension table and the fact table, wherein computing the filter factor of the join predicate between the dimension table and the fact table is performed using statistics relating to only the portion of the dimension table referred to by the fact table;
    determining, by one or more computer processors, a maximum and minimum value of a column in the dimension table; and
    creating, by one or more processors, a statistical view using the determined maximum and minimum values as a range predicate on the dimension table's join column, and using one or more relevant portions of the dimension table that are referred to by the fact table, wherein the one or more relevant portions of the dimension table include DATE and TIMESTAMP dimensions.

* * * * *